United States Patent
Wang et al.

(10) Patent No.: US 12,430,165 B2
(45) Date of Patent: Sep. 30, 2025

(54) IMPLEMENTING A POLICY-BASED AGENT WITH PLUGIN INFRASTRUCTURE

(71) Applicant: Microsoft Technology Licensing, LLC, Redmond, WA (US)

(72) Inventors: Weijian Wang, Burnaby (CA); Na Li, Bellevue, WA (US); Jun Shi, Redmond, WA (US); Yizhong Wu, Shanghai (CN); Xuling Luo, Shanghai (CN); Rongbin Han, Suzhou Industrial Park (CN); Pin Sun, Jiangsu (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 880 days.

(21) Appl. No.: 17/514,935

(22) Filed: Oct. 29, 2021

(65) Prior Publication Data
US 2023/0135013 A1    May 4, 2023

(51) Int. Cl.
*G06F 9/48* (2006.01)
*G06F 8/61* (2018.01)
(Continued)

(52) U.S. Cl.
CPC .............. *G06F 9/4881* (2013.01); *G06F 8/61* (2013.01); *G06F 8/65* (2013.01); *G06F 9/44526* (2013.01);
(Continued)

(58) Field of Classification Search
None
See application file for complete search history.

(56) References Cited

U.S. PATENT DOCUMENTS 7,254,814 B1 * 8/2007 Cormier .............. G06F 9/44526
                                                           717/121
9,135,002 B1 * 9/2015 Tarassov ................. G06F 9/485
(Continued)

OTHER PUBLICATIONS

Chiang et al., A Novel Software Agent Framework with Embedded Policy Control, 2005, MILCOM 2005—2005 IEEE Military Communications Conference, pp. 1-7 (Year: 2005).*

(Continued)

*Primary Examiner* — Anil Khatri
*Assistant Examiner* — Melissa A Headly
(74) *Attorney, Agent, or Firm* — Ray Quinney & Nebeker P.C.; James S. Bullough

(57) ABSTRACT

The present disclosure relates to implementing, updating, and managing operation of a client agent on a client device (e.g., computing device, virtual device) in a way that enables isolation of features and functionality while also allowing the client agent to self-heal and intelligently update discrete features thereon. The client agent includes a collection of plugins that are isolated and run in accordance with respective plugin policies. The client agent makes use of device-level, agent-level, and plugin-level health monitors that collectively monitor a health status of discrete components of the client agent in a way that enables the client agent to selectively discontinue scheduling certain plugins without interrupting functionality of other plugins or of the client agent as a whole. Indeed, features described herein enable the client agent to intelligently update and self-heal with respect to individual plugins based on information obtained by the respective health monitors.

19 Claims, 10 Drawing Sheets

(51) Int. Cl.

| | | |
|---|---|---|
| *G06F 8/65* | (2018.01) | |
| *G06F 9/445* | (2018.01) | |
| *G06F 11/30* | (2006.01) | |
| *G06F 11/34* | (2006.01) | |

(52) U.S. Cl.
CPC ...... *G06F 11/3006* (2013.01); *G06F 11/3423* (2013.01)

(56) References Cited

U.S. PATENT DOCUMENTS

| | | | | |
|---|---|---|---|---|
| 9,785,772 | B1* | 10/2017 | Johansson | G06F 21/56 |
| 2004/0073782 | A1 | 4/2004 | Price et al. | |
| 2012/0066666 | A1* | 3/2012 | Ng | G06F 11/3419 |
| | | | | 717/127 |
| 2015/0006693 | A1* | 1/2015 | Elias | H04L 41/0893 |
| | | | | 709/223 |

OTHER PUBLICATIONS

"Agent Client Collector architecture", Retrieved from: https://docs.servicenow.com/bundle/paris-it-operations-management/page/product/event-management/concept/acc-concept.html, Retrieved Date: May 24, 2020, 3 Pages.

"Agent Client Collector CPU protection thresholds", Retrieved from: https://docs.servicenow.com/bundle/paris-it-operations-management/page/product/event-management/reference/acc-set-silent-reference.html, Retrieved Date: Mar. 24, 2021, 2 Pages.

"Agent Client Collector plugins", Retrieved from: https://docs.servicenow.com/bundle/paris-it-operations-management/page/product/event-management/concept/acc-assets.html, Retrieved Date: Mar. 24, 2021, 2 Pages.

"Agent-based data flow", Retrieved from: https://docs.servicenow.com/bundle/paris-it-operations-management/page/product/event-management/concept/acc-events-alerts-metrics.html, Retrieved Date: May 24, 2021, 2 Pages.

"Alvarobrandon/fmone-agent", Retrieved from: https://hub.docker.com/r/alvarobrandon/fmone-agent/, Retrieved Date: Mar. 24, 2021, 5 Pages.

"Checks and policies", Retrieved from: https://docs.servicenow.com/bundle/paris-it-operations-management/page/product/event-management/concept/checks-policies.html, Retrieved Date: May 24, 2021, 2 Pages.

"Edit a published policy", Retrieved from: https://docs.servicenow.com/bundle/paris-it-operations-management/page/product/event-management/task/acc-edit-published-policy.html, Retrieved Date: May 24, 2021, 3 Pages.

"Monitoring the health of a server", Retrieved from: http://publib.dhe.ibm.com/wasce/V2.1.1/en/monitoring-the-health-of-a-server.html, Retrieved Date: Mar. 24, 2021, 7 Pages.

"NetPath", Retrieved from: https://sourceforge.net/projects/netpath/, Mar. 8, 2007, 4 Pages.

"NetPath Missing in Installed Agent Plugins", Retrieved from: https://thwack.solarwinds.com/product-forums/network-performance-monitor-npm/f/forum/75189/netpath-missing-in-installed-agent-plugins, Retrieved Date: May 24, 2021, 3 Pages.

"Network Performance Monitor", Retrieved from: https://web.archive.org/web/20210914095134/https://www.solarwinds.com/network-performance-monitor, Sep. 14, 2021, 7 Pages.

"Network Performance Monitoring Setup", Retrieved from: https://docs.datadoghq.com/network_monitoring/performance/setup/?tab=agentlinux, Retrieved Date: Mar. 24, 2021, 9 Pages.

"Poll devices with SolarWinds Orion agents", Retrieved from: https://web.archive.org/web/20210127204501/https://documentation.solarwinds.com/en/Success_Center/orionplatform/Content/Core-SolarWinds-Orion-Agents-sw467.htm, Jan. 27, 2021, 4 Pages.

"Sysadmin", Retrieved from: https://www.reddit.com/r/sysadmin/wiki/monitoring, Oct. 22, 2018, 8 Pages.

"Tachyon", Retrieved from: https://www.1e.com/products/tachyon/, Jun. 4, 2021, 9 Pages.

"Telegraf", Retrieved from: https://www.influxdata.com/time-series-platform/telegraf/, Aug. 15, 2021, 12 pages.

"Visualize the full network path from source to destination with cloud monitoring from NetPath™", Retrieved from: https://web.archive.org/web/20201214210836/https://www.solarwinds.com/network-performance-monitor/use-cases/cloud-monitoring, Dec. 14, 2020, 8 Pages.

Brandón, et al., "FMonE: A Flexible Monitoring Solution at the Edge", In Journal of Wireless Communications and Mobile Computing, vol. 2018, Article ID 2068278, Nov. 19, 2018, 15 Pages.

Czechowski, et al., "Client health with co-management", Retrieved from: https://docs.microsoft.com/en us/mem/configmgr/comanage/quickstart-client-health, Jan. 14, 2019, 5 Pages.

Gabrielli, Bruno, "Maintain Your Microsoft Monitoring Agent Up To Date With Azure Automation", Retrieved from: https://techcommunity.microsoft.com/t5/core-infrastructure-and-security/maintain-your-microsoft-monitoring-agent-up-to-date-with-azure/ba-p/1723083, Oct. 16, 2020, 10 Pages.

Hans, et al., "Supported collectors list", Retrieved from: https://github.com/netdata/netdata/blob/master/collectors/COLLECTORS.md#netdata-collectors, Jul. 8, 2021, 16 Pages.

Sharkey, et al., "Windows Management Instrumentation", Retrieved from: https://docs.microsoft.com/en-us/windows/win32/wmisdk/wmi-start-page, Sep. 10, 2021, 4 Pages.

Taherizadeh, et al., "Monitoring self-adaptive applications within edge computing frameworks: A state-of-the-art review", In Journal of the Systems and Software, vol. 136, Feb. 2018, pp. 19-38.

Wren, et al., "Azure Monitor agent overview", https://docs.microsoft.com/en-us/azure/azure-monitor/agents/azure-monitor-agent-overview?tabs=PowerShellWindows, Sep. 21, 2021, 11 Pages.

Wren, et al., "Managing and maintaining the Log Analytics agent for Windows and Linux", Retrieved from: https://docs.microsoft.com/en-us/azure/azure-monitor/agents/agent-manage#/update-proxy-settings, Jun. 14, 2019, 14 Pages.

Iiie, et al., "Task Scheduler", Retrieved from: https://docs.microsoft.com/en-us/dynamics365/business-central/dev-itpro/developer/devenv-task-scheduler, Oct. 1, 2021, 7 Pages.

Chiang, et al., "A Novel Software Agent Framework with Embedded Policy Control", In Proceedings of IEEE Military Communications Conference, Oct. 17, 2005, 7 Pages.

"Invitation to Pay Additional Fees Issued in PCT Application No. PCT/US22/042575", Mailed Date: Mar. 6, 2023, 16 Pages.

"International Search Report and Written Opinion Issued in PCT Application No. PCT/US22/042575", Mailed Date: Apr. 28, 2023, 21 Pages.

* cited by examiner

IMPLEMENTING A POLICY-BASED AGENT WITH PLUGIN INFRASTRUCTURE

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients or customers. These virtual services can be hosted by respective server nodes on a cloud computing system.

As demand for cloud computing resources (and computing resources generally) continue to grow in popularity, computing devices have become more capable and increasingly complex. Indeed, computing devices are being used for an increasingly diverse number of tasks. Many of these features and functionalities are managed by software agents that are configured to execute any number of tasks. Conventional software agents, however, suffer from a number of drawbacks and limitations.

For example, conventional agents are often programmed or otherwise configured to perform a wide variety of independent functions that are not necessarily isolated from one another. As a result, where one function may fail or where the agent is unable to process a particular task for some reason or another, this failure may cause other features and functionalities to be disabled or execute incorrectly. Indeed, in many cases, a problem in any part of a conventional agent may cause the entire agent to fail.

These and other problems exist in connection with implementing client agents on computing devices.

DETAILED DESCRIPTION

Figure 1:
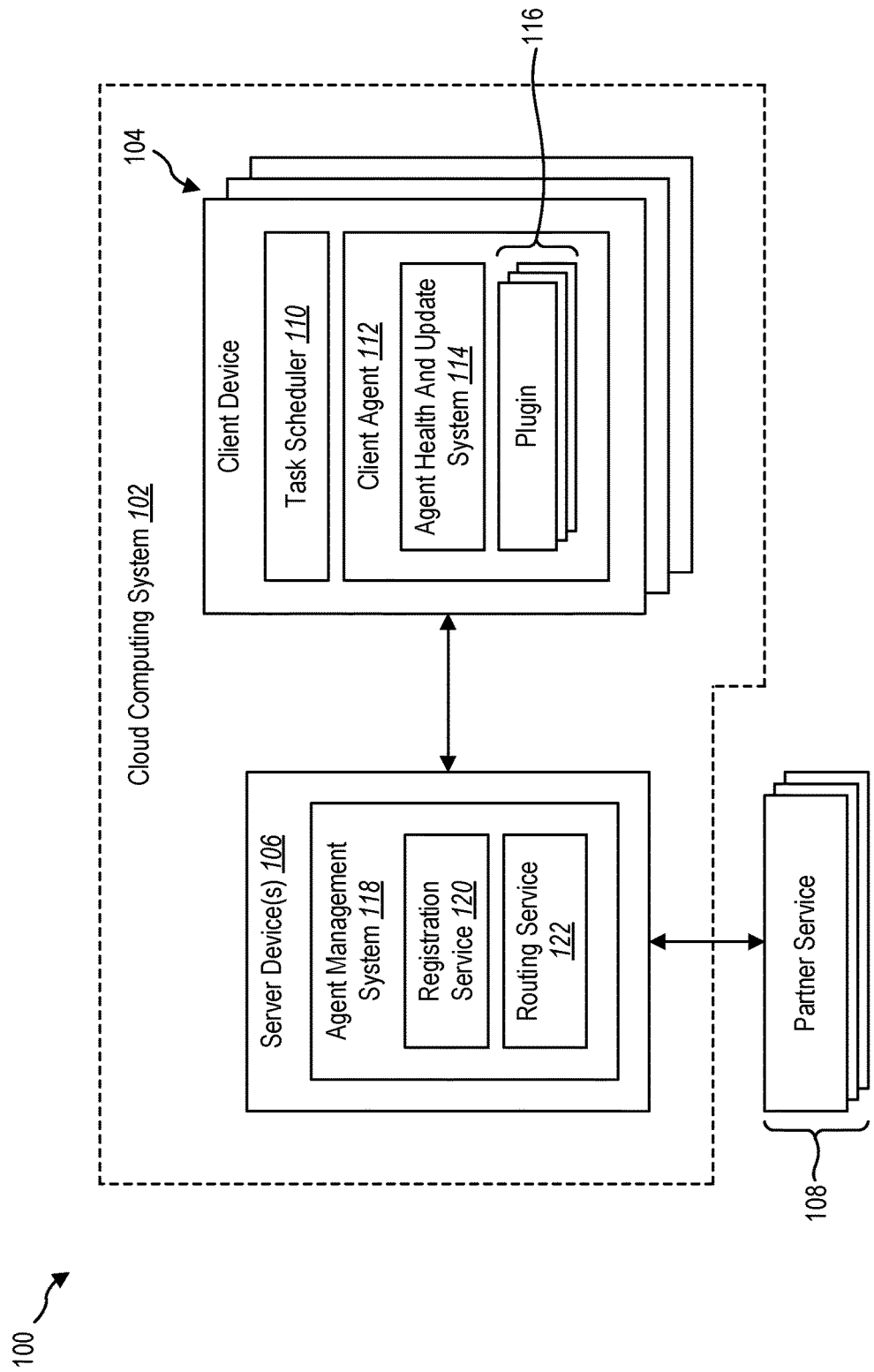
FIG. 1 illustrates an example environment of a cloud computing system showing an example client agent on an example client device in accordance with one or more embodiments.

The present disclosure is generally related to implementing, updating, and otherwise managing operation of a client agent on a client device, such as a computing device or a virtual device, in a way that enables isolation of features and functionality while also providing features related to self-healing and intelligently updating the client agent on the client device. As will be discussed in further detail below, the client agent may include an agent health and update system that manages operation of a number of plugins that provide discrete features and functionality to the client agent on the client device. In one or more embodiments, the client device may make use of a device health monitor, an agent health monitor, and a plugin health monitor that collectively enable the client device and/or client agent to troubleshoot various problems and reduce a number of instances in which the client agent is shut down unnecessarily. Moreover, the client agent may include features and functionality that enable the client device to intelligently incorporate updates to the agent and/or plugins.

As a first illustrative example, in one or more embodiments, the client agent may be installed or otherwise be implemented on a client device by installing and running a plurality of plugins associated with multiple functions where each execution of each plugin has a respective thread of execution that is isolated from other threads of execution for other plugins. In addition, a scheduler may be installed and be configured to trigger runtimes for each plugin of the plurality of plugins in accordance with policies maintained on the client device. In one or more embodiments, the client device may maintain a table of policies that govern functionality of the client agent and plugins and provide access to the scheduler for triggering the runtimes in accordance with the policies. In one or more embodiments, the client device may further implement a plurality of health monitors to diagnose a health status for the agent. As noted above, the health monitors may include a device health monitor, an agent health monitor, and a plugin health monitor configured to track resource usage (e.g., processing usage, computing usage, plugin execution time(s)) at respective boundaries or levels of the system.

As a second illustrative example, in one or more embodiments, the client agent may be installed, and a table of policies may be maintained on a client device similar to the first illustrative example discussed above. In addition, in one or more embodiments, the client device may implement one or more updates to one or more plugins from the plurality of plugins based on an update notification received from a registration service on a cloud computing system. In one or more embodiments, the client device implements an update by receiving one or more modifications to policies maintained on the table of policies and continues to schedule execution of the plugins based on the updated policies. In one or more embodiments, the client device implements an update by updating the client agent to an updated or upgraded version of the client agent. For instance, in one or more implementations, partner services may provide plugin updates to a registration service that may be used to trigger an update or otherwise be added to a scheduled agent update.

The present disclosure includes a number of practical applications that provide benefits and/or solve problems associated with implementing an agent having a plugin framework in accordance with one or more embodiments described herein. Some non-limiting examples of these applications and benefits are discussed in further detail below.

For example, as mentioned above, one or more embodiments of the client agent(s) described herein provide an isolated plugin framework in which execution threads are executed individual by each respective plugin. This isolation is achieved by scheduling the plugins individual based on respective policies maintained on the client device (e.g., within a plugin policy table). In one or more embodiments, the plugins are executed by different processing resources from one another. Isolating the plugins in accordance with one or more embodiments described herein enables the client agent to continue operating even where one or more individual plugins may be faulty or otherwise fail.

In addition to isolating execution of the respective plugins, systems described herein implement a plurality of health monitors that track a variety of resource metrics for the client agent. For example, a system monitor on a client device and an agent monitor within the client agent may monitor resource usage (e.g., central processing unit (CPU) and memory usage) of the agent to determine if the client agent is operating in violation of one or more policies. This may allow the client agent to take one or more remedial actions, such as delaying a schedule of various plugins to enable the client agent to continue running for some period of time before deciding to shut down or restart the agent. This allows the client agent to self-heal in many instances without interrupting operation of the client device.

In addition to device-level and agent-level health monitors, the client agent may include a plugin health monitor that is configured to monitor resource usage metrics by individual plugins. For example, in one or more embodiments, a plugin health monitor can track or otherwise observe an execution time associated with executing one or more plugin tasks to determine if the plugin is operating in accordance with one or more policy parameters. Where the plugin is not executing in accordance with a policy, the scheduler may discontinue scheduling the plugin for some period of time while still enabling other plugins to continue performing tasks. Similar to the advantages above, this enables the client agent to run other plugins and otherwise operate as configured without interrupting operation of the client device and/or entire client agent based on a failure of a single plugin. This further enables the client agent to diagnose whether a policy failure is caused by a select plugin or whether failures observed by a client and/or device agent are a larger system-wide problem.

The client agent may further incorporate features and functionalities that enable the client agent to update the plugins and/or agent in an intelligent and effective manner. For example, in one or more embodiments, the client agent may update discrete plugins by maintaining policies for each of the plugins within a local policy table and allowing one or more services to update select policies for corresponding plugins. By updating policies associated with respective plugins, the client agent may modify triggers and/or runtime behaviors of one or more plugins without modifying other plugins or requiring that the entire client agent be updated with each discrete behavior change.

Further, the client agent itself may be updated in an intelligent manner that reduces widespread agent errors while also allowing partner services to contribute in the development and implementation of plugins within respective client agents. For example, as will be discussed in one or more embodiments below, client agents may be updated from one version to another using a plurality of test rings to ensure that an updated agent and plugins thereon are operating as designed before adopting in a wide scale. The update process described herein may further enable partner services to provide individual plugins and/or plugin updates in a way that allows for small-scale testing and troubleshooting potential errors as well as ultimately enabling those plugins and/or plugin updates to be incorporated withing agent updates.

As illustrated in the foregoing discussion, the present disclosure utilizes a variety of terms to describe features and advantages of the systems described herein. Additional detail is now provided regarding the meaning of some example terms.

For example, as used herein, a "cloud computing system" may refer to a network of connected computing devices that provide various services to customer devices (e.g., client devices, network devices). For instance, a distributed computing system can include a collection of physical server devices (e.g., server nodes) organized in a hierarchical structure including clusters, computing zones, virtual local area networks (VLANs), racks, fault domains, etc. The cloud computing system may refer to a private or public cloud computing system.

As used herein, a "client device" may refer to a physical or virtual computing device capable of implementing a client agent in accordance with one or more embodiments described herein. One or more embodiments of a client device may refer to various types of computing devices including, by way of example, mobile devices, desktop computers, server devices, or other types of computing devices having software agents thereon. In one or more embodiments, a client device refers to a virtual device, which may include an emulation of a computer system on a server node that provides functionality of one or more applications on a cloud computing system. In one or more embodiments, a virtual device refers to an emulation of a computing device associated with an individual account or individual user. A virtual device may refer to one of a plurality of virtual devices of a tenant deployment. It will be understood that while one or more specific examples and implementations described herein relate specifically to virtual devices, features and functionality described in connection with a virtual device may similarly refer to other types of virtual machines, computing containers, or computing devices generally.

As used herein, a "client agent" refers to a software or piece of software employed on a client device that is configured or can be configured to execute one or more functions. In one or more embodiments described herein, a client agent refers to a collection of plugins and one or more modules tasked with managing operation of the client agent on the client device. As used herein, a "plugin" refers to any add on feature or functionality to a client agent that is configured to perform one or more particular tasks. In one or more embodiments described herein, a plugin refers to a portion of software that is configured to execute a thread. As will be discussed in further detail herein, a plurality of plugins may refer to a plurality of add-ons each configured to execute or otherwise process a thread of execution (or simply an execution thread).

As used herein, "resource usage" may refer to a metric of resource consumption by one or more components discussed herein. For example, a computing device and/or client agent may refer to a metric of CPU and/or processing consumed by a computer system or client agent, respectively. In one or more examples discussed herein, resource usage may refer to a duration of time associated with execution of one or more tasks. For example, in one or more embodiments described herein, a resource metric may refer to a time of execution for one or more plugins associated with a duration of runtime for the respective plugin(s).

Additional detail will now be provided regarding systems described herein in relation to illustrative figures portraying example implementations. For example, FIG. 1 illustrates an example environment 100 including a cloud computing system 102 having one or client devices 104 and a server device(s) 106 in accordance with one or more embodiments. As further shown in FIG. 1, the environment 100 may include a number of partner services 108 for providing information related to implementing one or more plugins (e.g., third-party plugins) on the client devices 104.

As shown in FIG. 1, each of the client devices 104 may include a task scheduler 110 and a client agent 112. The client agent 112 may include an agent health and update system 114 and a plurality of plugins 116. As further shown, the server device(s) 106 may include a registration service 120 and a routing service 122. The client devices 104, server device(s) 106, and partner services 108 may communicate by way of one or more networks. For example, the respective devices and services may communicate over one or multiple networks that use one or more communication platforms or technologies for transmitting data. For instance, where the client devices 104 and server device(s) 106 are internal to the cloud computing system 102, the respective devices may communicate over an internal or private network while communicating with the partner services 108 via an external or public network (e.g., the Internet). Indeed, it is appreciated that the devices and services may communicate over any communication link that enables transport of electronic data between the respective devices and/or services.

As noted above, the client devices 104 each include a client agent 112 having features and functionalities described herein. For example, as shown in FIG. 1, an example client device includes a client agent 112 having a plugin infrastructure. For instance, as will be discussed in further detail below, the client agent 112 includes a plurality of plugins that are associated with a variety of functions. Each plugin of the plurality of plugins 116 may be configured to execute a respective execution thread that is isolated from other execution threads for other plugins from the plurality of plugins 116. As will be discussed in further detail below, each of the plurality of plugins 116 may operate in accordance with one or more plugin policies.

As further noted above, the client agent 112 may include an agent health and update system 114 that is configured to monitor a health status for the client agent 112 as well as individual plugins from the plurality of plugins 116. In particular, as will be discussed in further detail below, the agent health and update system 114 may include a plurality of health monitors configured to monitor health of the overall client agent 112 as well as each individual plugin from the plurality of plugins. These health monitors may operate in conjunction with a device-level plugin on the task scheduler 110 that is additional configured to monitor health of the client agent 112 and/or client device as a whole.

In addition to monitoring health, the agent health and update system 114 may implement one or more updates to the client agent 112 in accordance with one or more embodiments described herein. For example, in one or more embodiments, the agent health and update system 114 may implement an update to one or more policies of the client agent 112 and/or for respective plugins 116. The agent health and update system 114 may additionally implement features related to upgrading or otherwise updating the entire client agent 112 in accordance with one or more examples described herein.

As mentioned above, the server device(s) 106 may include an agent management system 118 that works cooperatively with components of the client devices 104 to implement features and functionalities described herein. For example, as shown in FIG. 1, the agent management system 118 may include a registration service 120 configured to register the client devices 104 and/or client agents 112 to facilitate communication between the client devices 104 and other devices of the cloud computing system 102. As will be discussed in further detail below, this may involve verifying or otherwise registering respective client agents and/or plugin data received from the partner services 108. In one or more embodiments, registering the client agents 112 may involve providing a tag parameter associated with a unique identifier for a corresponding client device to be stored on the cloud computing system 102. Later, when the client agent 112 provides usage reports and other outputs to the agent management system 118, a registration service 120 on can identify a specific destination or service (e.g., partner service) as a destination for the relevant information. This can ensure data being provided to the correct destination as well as prevent duplicate plugin implementations.

As further shown, the agent management system 118 may include a routing service 122 configured to collect and relay usage information for respective client devices 104. For example, in one or more embodiments, the agent management system 118 may receive and redirect usage data for a client agent and/or for individual plugins to various destinations internal or external to a cloud computing system. As noted above, this resource usage data may include information related to CPU and/or memory usage. The resource usage data may additionally or alternatively include execution duration data for one or more plugins 116 on the client agent 112. The routing service 122 can provide the resource usage data to one or more services including services internal to the cloud computing system 102 as well as external services, such as the partner services 108.

The agent management system 118 may include additional services related to other features and functionalities discussed herein. For example, while not shown in FIG. 1, the agent management system 118 may include a deployment service configured to deploy respective versions of the client agent 112. As will be discussed in further detail below, this may involve intelligently deploying client agents 112 having respective updates (e.g., updated plugins) in accordance with a plurality of deployment rings. The agent management system 118 may additionally provide a number of updates to various plugins, such as new plugins and/or updated policies for existing plugins, for implementation on the client agent 112.

It will be appreciated that FIG. 1 illustrates an example arrangement of components of the environment 100 in accordance with one or more embodiments described herein. It will be understood that one or more components and services may be implemented on different devices that are internal or external to the cloud computing system 102. For example, one or more features of the components of the client device 104 may be implemented on the server device(s) 106. Conversely, one or more features of the components on the server device(s) 106 may be implemented on one or more of the client devices 104. Moreover, one or more of the partner services 108 may be implemented or otherwise hosted on the cloud computing system 102.

Figure 2:
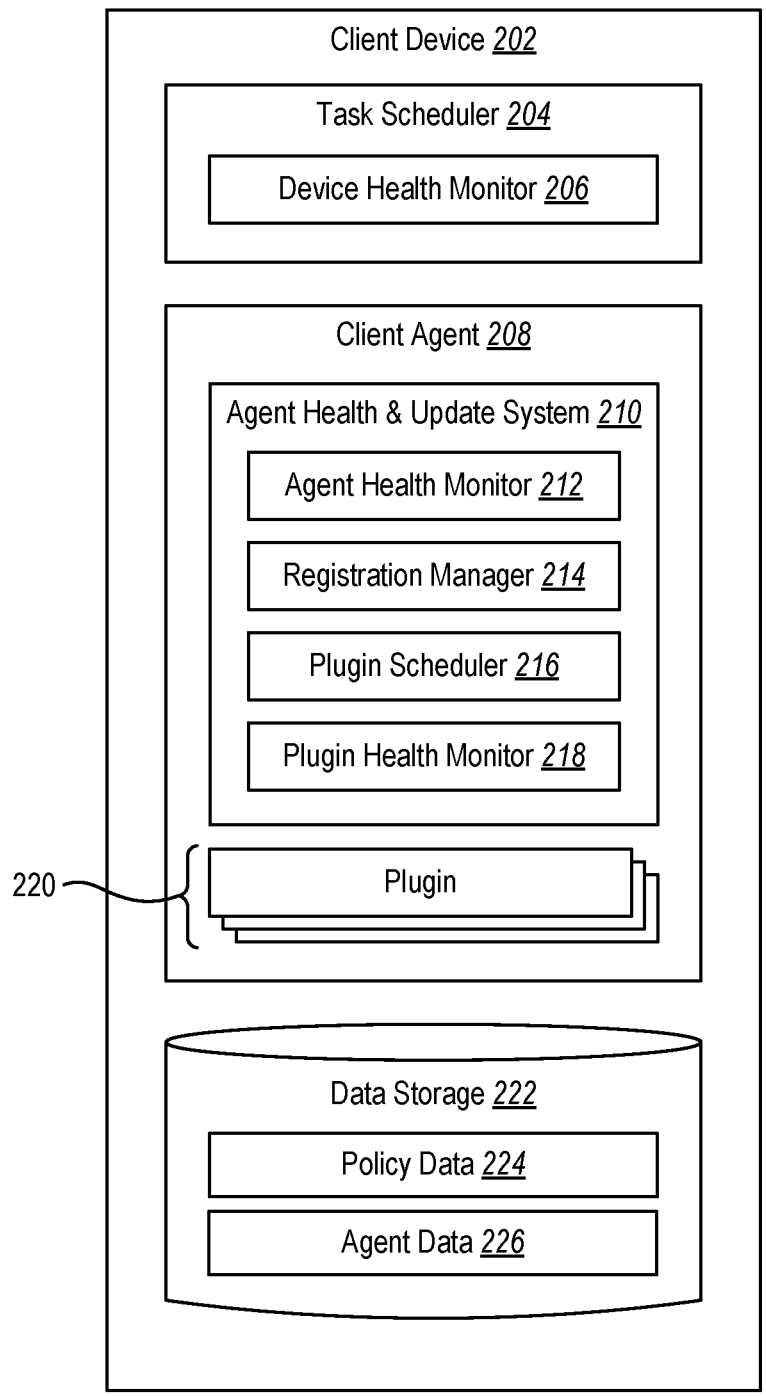
FIG. 2 illustrates an example implementation of a client device having a client agent implemented thereon in accordance with one or more embodiments.

FIG. 2 illustrates a more detailed implementation of a client device 202 in accordance with one or more embodiments described herein. As shown in FIG. 2, the example client device 202 may include similar components having similar features and functionality as discussed above in connection with the plurality of client devices 104 described above. For example, as illustrated in FIG. 2, the client device 202 may include a task scheduler 204 having a device health monitor 206 thereon. The device health monitor 206 may be configured to monitor a health status for the client device 202. For example, the device health monitor 206 may monitor or track usage of memory and/or CPU usage by various components of the client device 202. In one or more embodiments, the device health monitor 206 may make a determination whether the tracked CPU and/or memory usage is in violation of one or more agent policies.

In one or more embodiments, the device health monitor 206 refers to a health monitor outside a boundary of the client agent 208 that is configured to monitor resource usage of the client agent 208. For example, in one or more implementations, the device health monitor 206 tracks CPU and memory usage of the client agent 208 to determine whether the client agent 208 is utilizing a predicted or otherwise expected quantity of computing resources on the client device 202. For instance, the device health monitor 206 may monitor CPU and/or memory usage to determine whether the client agent 208 is consuming a quantity of resources above a policy threshold.

As further shown in FIG. 2, the client agent 208 may include the agent health and update system 210 having a number of components thereon. In one or more embodiments, the agent health and update system 210 includes an agent health monitor 212 configured to monitor resource usage of the client agent 208. For example, in one or more embodiments, the agent health monitor 212 refers to a health monitor implemented within a boundary of the client agent 208 that is configured to internally monitor resource usage of the client agent 208. In one or more embodiments, the agent health monitor 212 tracks CPU and/or memory usage of the client agent 208 over some period of time. In one or more embodiments, the agent health monitor 212 determines whether the CPU and/or memory usage of the client agent 208 is within or exceeds a threshold quantity of computing resources over a duration of time (e.g., a predetermined duration of time).

As further shown, the agent health and update system 210 may include a registration manager 214. The registration manager 214 may be configured to perform a variety of acts related to registering and updating one or more components of the client agent 208. For example, in one or more embodiments, the registration manager 214 may register the client agent 112 with the cloud computing system 102. In one or more embodiments, the registration manager 214 may facilitate reporting of usage data to the various services of a cloud computing system and/or partner services external to the cloud. The registration manager 214 may additionally receive and implement policies related to operation of the plugins 220 on the client agent 208.

As further shown, the agent health and update system 210 may include a plugin scheduler 216. The plugin scheduler 216 may be configured to trigger runtimes for each plugin of a plurality of plugins 220. For example, as will be discussed in further detail below, the plugin scheduler 216 may access policy data stored on the client device 202 to schedule runtimes (e.g., schedule execution or processing of a thread) for each of the plugins in accordance with policies for each of the plugins 220. As will be discussed below, the plugin scheduler 216 may schedule runtimes or otherwise trigger execution of threads in accordance with multiple policies associated with respective plugins from the plurality of plugins 220.

The plugin scheduler 216 may trigger execution of the plugins in a variety of ways in accordance with one or more embodiments. For example, in one or more embodiments, the plugin scheduler 216 may periodically run at predetermined intervals (e.g., every 10, 20 seconds) and determine which of the plurality of plugins 220 should be activated. At each interval, the plugin scheduler 216 may determine which of the plurality of plugins to trigger in accordance with the plugin policies. At the intervals, the plugin scheduler 216 may determine if a plugin has an active status and/or whether resource usage data for the client agent 208 and/or respective plugins 220 is in accordance with one or more relevant policies.

As noted above, the plugin scheduler 216 may schedule runtimes by triggering execution of threads and otherwise managing operations of the plugins 220 in accordance with policies associated with the respective plugins 220. For example, in one or more embodiments, each plugin may be associated with a first policy that includes metadata of a corresponding plugin that indicates whether the plugin is enabled or disabled. The plugin scheduler 216 may utilize this first policy to trigger a runtime for a corresponding policy when the first policy indicates that the plugin is active.

In addition to the first policy, each plugin may be associated with a second policy that indicates a schedule and runtime behavior for the associated plugin. In this example, the plugin scheduler 216 may poll the second policy and, upon determining that the plugin is active, the plugin scheduler 216 may schedule a runtime for the associated plugin in accordance with data from the second policy.

Each of the policies associated with the corresponding plugins may be updated selectively and may originate from different sources. For example, in one or more embodiments, a first policy may originate from a registration service on an internal system (e.g., the agent management system 118) of a cloud computing system. Conversely, the second policy may originate from a partner service external to the cloud computing system. Additional information in connection with implementing and updating the policies for the plurality of plugins 220 will be discussed in further detail below.

As shown in FIG. 2, the client agent 208 may include a plurality of plugins 220. As indicated in one or more implementations described herein, resource usage (e.g., execution times) of the plugins 220 may be monitored or otherwise tracked by a plugin health monitor 218. The plugin health monitor 218 may be configured to monitor or otherwise track resource usage for each of the plugins 220. For example, in one or more embodiments, a plugin health monitor 218 may track an execution time associated with running a plugin. In one or more implementations, the plugin health monitor 218 may track a duration of time that is takes to run an execution thread for a given plugin. As will be discussed below, the time of execution may be compared against a plugin policy to determine if the plugin is operating in accordance with the plugin policy.

As further shown in FIG. 2, the client device 202 may include a data storage 222 having data thereon that is accessible to components of the client device 202. For example, as shown in FIG. 2, the data storage 222 may include policy data 224. The policy data 224 may include any information associated with policies governing functionality of the client device 202, client agent 208, and/or associated plugins 220. For example, the policy data 224 may include one or more policies indicating CPU and/or memory thresholds that indicate a quantity of computing resources that the client agent 208 should consume when operating as expected. The policy data 224 may additionally include a number of policies for each of the plugins 220 that indicate how each of the plugins 220 should operate on the client agent 208. For example, as mentioned above, the policy data 224 may include a first plurality of policies indicating active or inactive metadata for the plugins 220. As another example, the policy data 224 may include a second plurality of policies indicating schedule and runtime behavior data indicating when and how each of the plugins should behave when triggered by the plugin scheduler 216.

As further shown in FIG. 2, the data storage 222 may include agent data 226. The agent data 226 may include any information associated with the client agent 208. For example, the agent data 226 may include registration information for the client agent 208. The agent data 226 may additionally include an indication of whether the client agent 208 is active for a given device. In one or more embodiments, the agent data 226 may include information associated with any number of plugins that are implemented on the client agent 208. In one or more embodiments, the agent data 226 includes update information, such as an indicated version of the client agent 208, identifiers for any number of plugins 220 that are active or inactive on the client agent 208, and any other information that may be used to determine whether to upgrade or otherwise update the client agent 208 in accordance with one or more embodiments described herein.

It will be appreciated that each of the components 204-222 on the client device 202 may include software, hardware, or a combination of both. Moreover, while one or more embodiments described herein refer to specific components 204-222 of the client device 202 performing respective functions, it will be understood that one or more of the components may be combined within a single component. Moreover, one or more features described in connection with a specific component may be performed or otherwise implemented by a different component of the client device 202.

Figure 3:
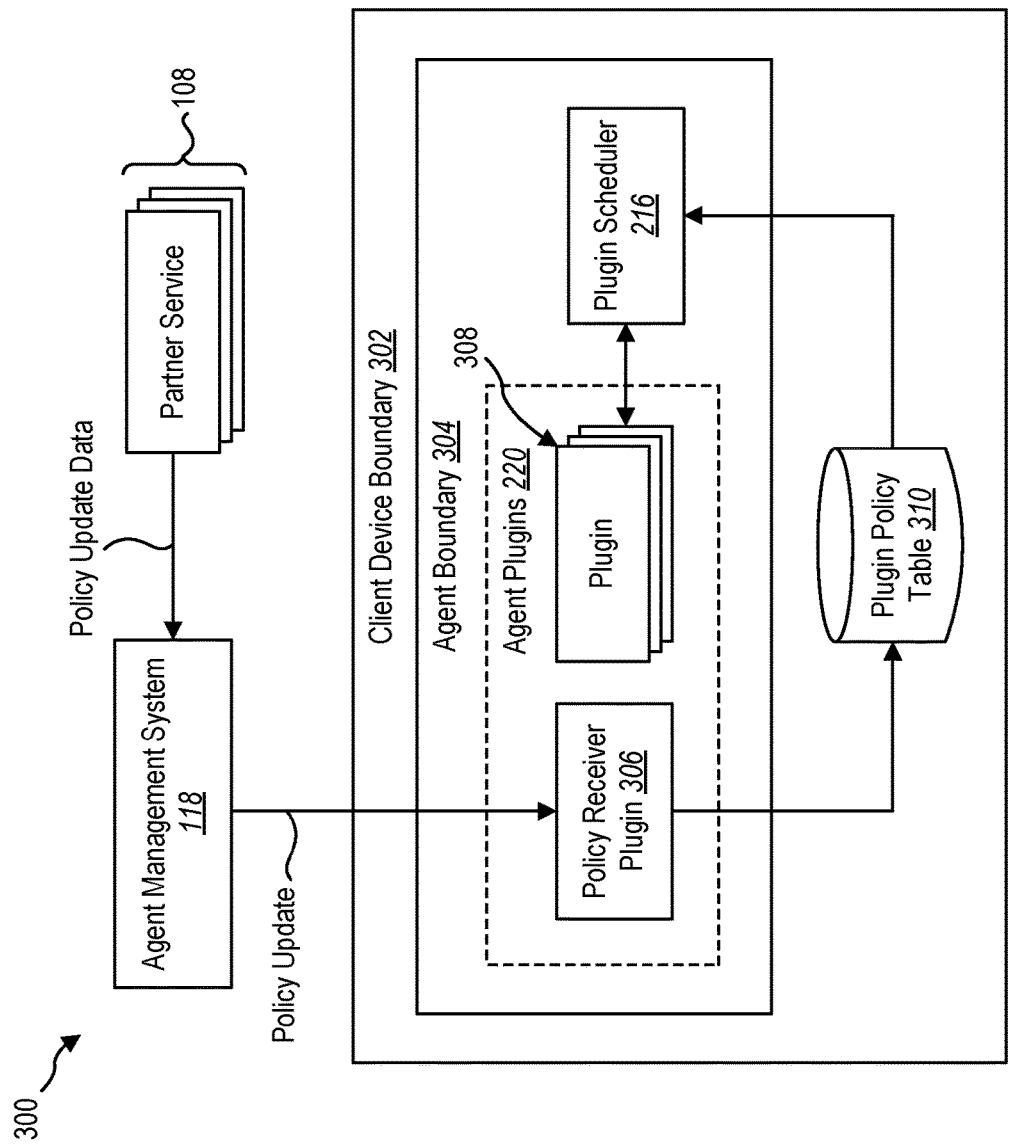
FIG. 3 illustrates an example implementation showing a process for updating one or more policies for a client agent in accordance with one or more embodiments.

FIG. 3 illustrates a workflow 300 showing an example implementation of a client agent having a plugin framework in accordance with one or more embodiments described herein. In particular, FIG. 3 illustrates an example workflow 300 showing features and functionality related to updating plugins on an example client agent in accordance with one or more embodiments described herein.

As shown in FIG. 3, the illustrated client agent includes a client device boundary 302 and an agent boundary 304. As shown in FIG. 3, the client device boundary 302 includes each of the components of the agent boundary 304 as well as a plugin policy table 310. As further shown, the agent boundary 304 includes a plurality of agent plugins 220 including a policy receiver plugin 306 and additional plugins 308 for executing a plurality of threads in accordance with one or more embodiments described herein. The agent boundary 304 further includes a plugin scheduler 216.

As shown in FIG. 3, the partner services 108 may provide policy update data to an agent management system 118. The agent management system 118 may validate or otherwise verify the policy update data to determine whether the policy update data originates from a trusted partner service and/or violates any rules or policies of a cloud computing system. It will be appreciated that the policy update data may refer to an update to any of a number of policies for one or more of the agent plugins 220. For example, in one or more embodiments, the policy update data may include an update to a runtime behavior and/or scheduling behavior for an associated plugin. Alternatively, the policy update may include an update to metadata indicating an active or inactive status of a corresponding plugin. Moreover, it will be understood that the policy update data may indicate one or more updates to policies that are specific to given plugin(s) as well as policies that affect functionality of the client agent and/or client device as a whole.

Upon receiving and verifying the policy update data, the agent management system 118 can provide the policy update to the client agent. In one or more embodiments, the agent management system 118 provides the policy update to a policy receiver plugin 306 from the agent plugins 220 that is configured to handle policy updates. For example, in one or more embodiments, the policy receiver plugin 306 may be configured to check for any policy updates from the agent management system 118. Indeed, similar to any number of the agent plugins 220, the policy receiver plugin 306 may be triggered (e.g., by the plugin scheduler 216) to execute a thread including instructions to request or otherwise query the agent management system 118 for any relevant policy updates originating from the partner services 108 or other source.

Upon receiving the policy update, the policy receiver plugin 306 (or other plugin) may cause the policy update to be stored within a plugin policy table 310. In one or more embodiments, this may involve modifying an existing policy within the plugin policy table 310. In one or more embodiments, the policy update refers to a new policy to become applicable to a previously inactive or new plugin that has been recently installed on the client agent. In either example, the policy update is persisted within the plugin policy table 310 to be made accessible to the plugin scheduler 216 in accordance with one or more embodiments described herein.

As noted above, the plugin scheduler 216 may be configured to run periodically (e.g., every 20 seconds) to determine any and all of the agent plugins 220 that should be triggered in accordance with information from the plugin policy table 310. For example, as shown in FIG. 3, the plugin scheduler 216 may access the plugin policy table 310 and determine which of a plurality of plugins 308 are active and whether policy conditions exist that merits triggering one or more of the plugins 308.

It will be noted that before the policy update is added to the plugin policy table 310, the plugin scheduler 216 may trigger each of the plugins 308 in accordance with an old plugin policy prior to receiving the policy update from the agent management system 118. Upon receiving the policy update and storing the update to the plugin policy table 310, the plugin scheduler 216 may trigger runtime behavior in accordance with any modifications or additions to the policy data stored within the plugin policy table.

This policy update process provides a number of benefits over conventional client agents. For example, updating the plugin policy table 310 in the manner shown in FIG. 3 enables the plugin scheduler 216 to selectively modify behavior of certain plugins from the set of plugins 308 without affecting operation of the entire client agent. In particular, by maintaining plugin policies for each of the plugins 308, the plugin scheduler 216 can access and enact updated runtime behavior and scheduling policies without interrupting functionality of those plugins whose policies remain unchanged. Indeed, because the plugins are configured to execute isolated threads in accordance with individual plugin policies, any number of plugin policies may be updated without rebooting the client device and/or ceasing operation of other functionalities of the client agent, as is often the case with conventional software agents.

Figure 4:
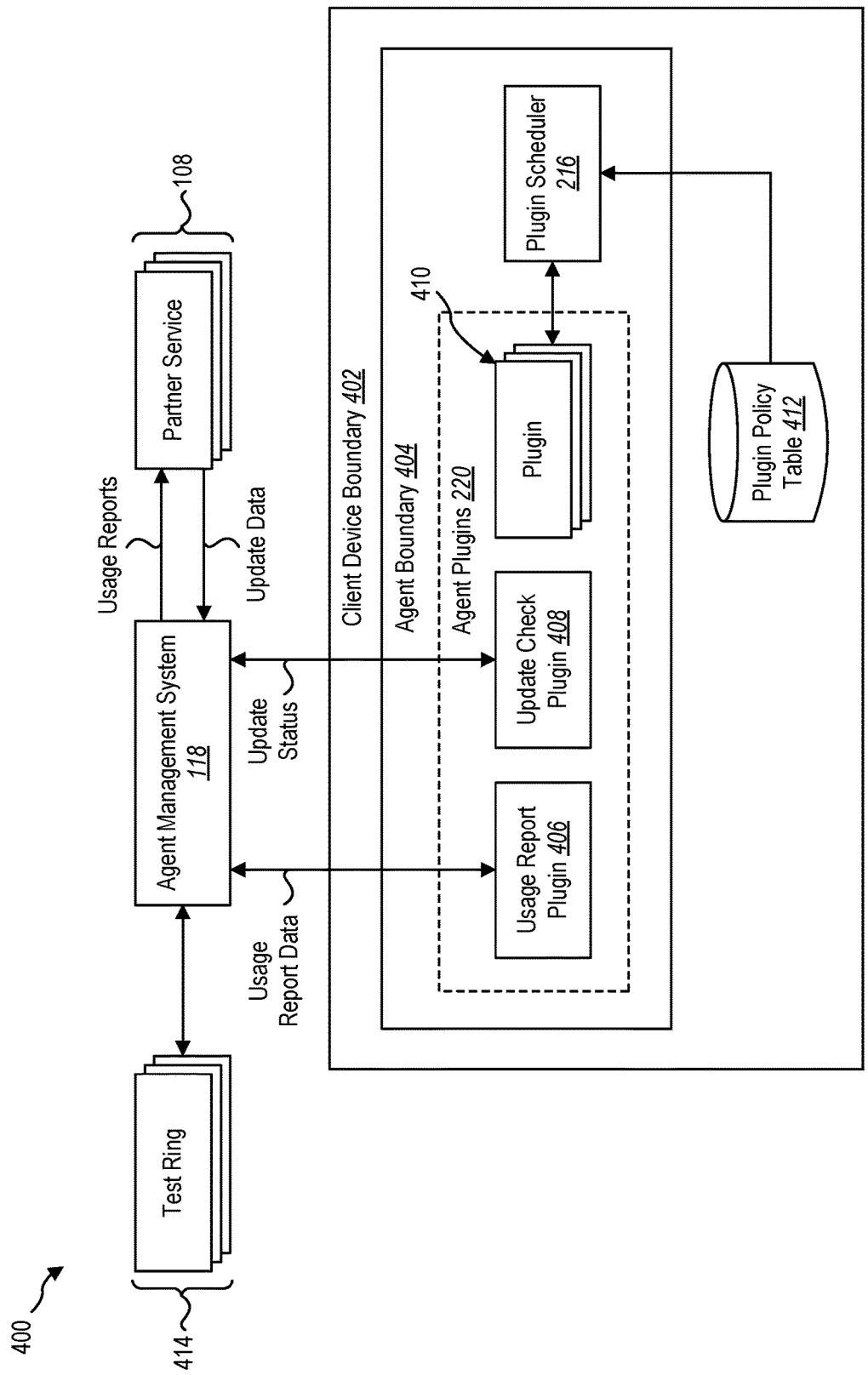
FIG. 4 illustrates an example implementation showing a process for updating a version of the client agent in accordance with one or more embodiments.

FIG. 4 illustrates a workflow 400 showing an example implementation of a client agent having a plugin framework in accordance with one or more embodiments described herein. In particular, FIG. 4 illustrates an example workflow 400 showing features and functionality related to updating (e.g., upgrading) a client agent in accordance with one or more embodiments described herein. Similar to FIG. 3, the workflow 400 shows a client device having a client device boundary 402 and an agent boundary 404 having a plurality of agent plugins 220 thereon. The agent plugins 220 may include a usage report plugin 406, an update check plugin 408, and additional plugins 410 representative of any other plugins on the plurality of agent plugins 220. Similar to FIG. 3, client device boundary 402 may include a plugin policy table 412 maintained thereon.

In one or more embodiments, the usage report plugin 406 may be configured to provide usage report data to the agent management system 118. For example, as noted above, and as will be discussed in further detail below, the client device and client agent may include a number of health monitors that track or otherwise collect resource usage information including CPU and memory usage as well as execution timing data for the various plugins and client agent(s). In this example, the usage report plugin 406 may be configured to provide usage report data including monitored usage data as well as other information indicating how the client agent is running on the client device.

Upon receiving this information, the agent management system 118 may generate one or more usage reports for various components of the client device. In one or more embodiments, the agent management system 118 may generate usage reports for the client agent generally. In one or more embodiments, the agent management system 118 generates usage reports for each of the plugins (e.g., based on received execution times tracked by a plugin health monitor). In one or more embodiments, the agent management system 118 can provide the usage reports to the partner services 108. For example, the agent management system 118 may provide usage reports for any plugins associated with respective partner services.

In one or more embodiments, the partner services 108 may utilize the usage reports to develop modifications to various plugins. The partner services 108 may similarly utilize the usage reports to develop new plugins associated with different runtime behaviors. In either case, the partner services 108 may provide update data to the agent management system 118 for use in creating new updates to the client agents. This may involve implementing new plugins, upgrading existing plugins, or modifications to the client agents themselves.

While not shown in FIG. 4, the agent management system 118 may additionally provide usage reports to other components internal to a cloud computing system on which the agent management system 118 is implemented. In addition, in one or more embodiments, the agent management system 118 receives update data for one or more plugins or for the client agent as a whole from other components on the cloud computing system.

Based on the update data, the agent management system 118 may compile, develop, or otherwise create updated versions of client agents to be deployed on client devices of the cloud computing system. Rather than deploying the updated version(s) of the client agents on each of a large set of client devices, the agent management system 118 may employ a plurality of test rings 414 associated with different groupings of client devices. For example, in one or more embodiments, the agent management system 118 may deploy an updated version of a client agent on a first test ring while allowing an older (e.g., stable) version of the client agent to be deployed on additional test rings.

The agent management system 118 may continue to monitor usage report data for client agents from the first test ring over some period of time. After some period of time has passed with a number of errors or indicated problems associated with the updated client agents staying below a minimum threshold, the agent management system 118 may expand deployment of the updated client agents to a second test ring inclusive of a larger set of client devices than the first test ring. The agent management system 118 may continue to monitor performance of the updated client agents and expand deploying to larger test rings until the client agent is ready to be deployed on a large scale across the cloud. In each of the example deployments, the agent management system 118 may continue receiving usage report data from usage report plugins on respective client agents, generating usage reports to provide to partner services 108, and receive relevant update data.

As shown in FIG. 4, the client agent may include an update check plugin 408. The update check plugin 408 may be configured to check for client updates from the agent management system 118 in accordance with a respective plugin policy. For example, in one or more embodiments, the update check plugin 408 may be configured to check for an update status once per day or other interval of time. When upgrading the client agent to a new version, the client agent will stop operation and a file for the upgraded client agent will be installed. In this example, operation of the client agent will be interrupted during the agent upgrade.

Similar to one or more embodiments described herein, the plugin policy table 412 may include client agent update policies specific to the update check plugin 408. For example, in one or more embodiments, the specific client device may be associated with a tenant having a preference to update the client agent with a specific test ring from the plurality of test rings 414. For instance, where a first tenant is more comfortable with updating to keep current with agent updates, the plugin policy table 412 on each of the client devices associated with the first tenant may include policy data indicating a preference to update based on an update being applicable to a first or second test ring. Alternatively, where a second tenant is less comfortable with updating and instead prefers to ensure that each client agent version is a secure version, even if outdated, the plugin policy table 412 may include policy data indicating a preference to only update based on an update being applicable to a third or final test ring. In each of the above examples, the update check plugin 408 may trigger an update based on a plugin policy indicated as active in order to trigger a client agent update by a corresponding plugin from the set of plugins 410 configured to facilitate an update of the client agent. Similar to other embodiments described herein, policies related to updating the client agent may be updated (e.g., in accordance with the example shown in FIG. 3) without interrupting operation of the client agent as a whole. Thus, a tenant may choose to enlist within any one of the test rings 414 without interrupting normal functionality of the client agent.

As noted above, a client device may include a number of health monitors for diagnosing a health status for the client agent as well as a health status for any of a plurality of plugins on the client agent. In one or more embodiments, the health monitors collect resource usage data for update purposes similar to the implementations discussed above in connection with FIGS. 3 and 4. In addition, or as an alternative, the health monitors may collect resource usage data for use in self-healing the client agent and/or individual plugins thereon. Additional detail will now be discussed in connection with FIGS. 5A-5C.

Figure 5A:
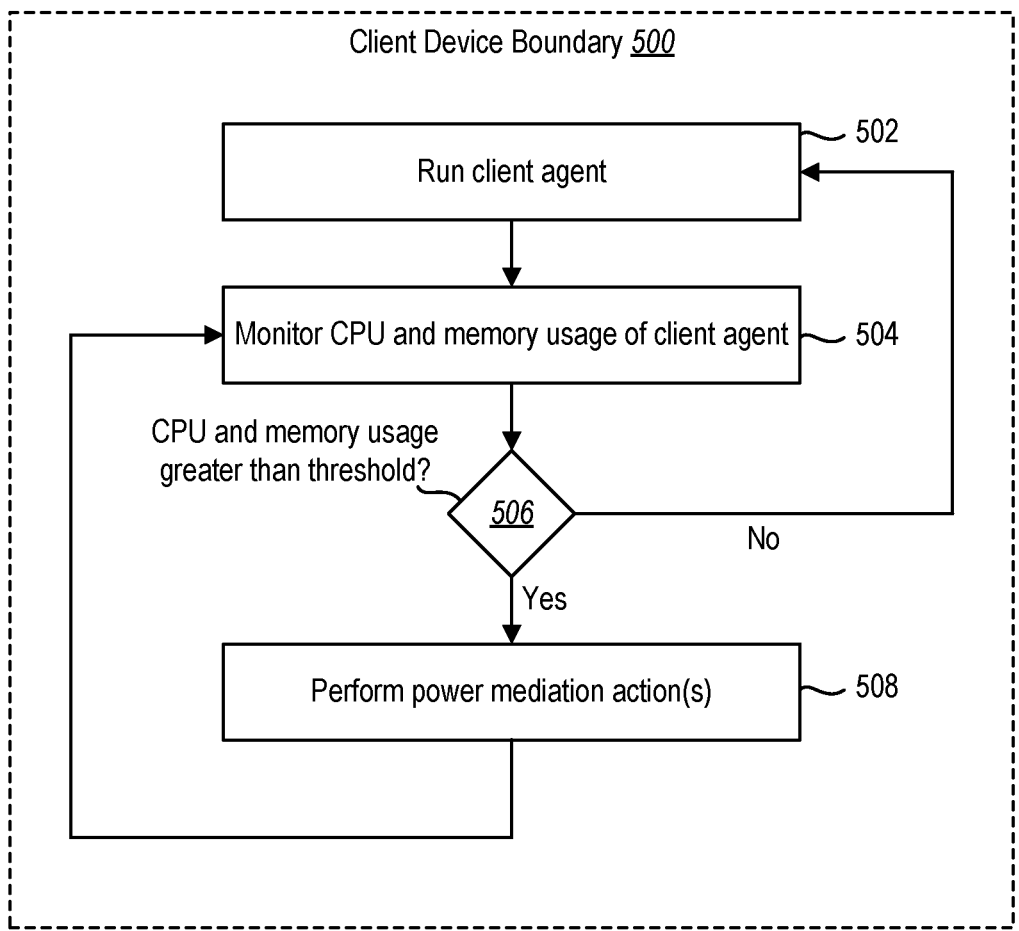
FIG. 5A illustrates an example implementation in which a device-level health monitor tracks resource usage of a client agent in accordance with one or more embodiments.

For example, FIG. 5A illustrates an example implementation showing a series of acts that may be performed in connection with collecting resource usage data and self-healing at a device level. In particular, as shown in FIG. 5A, a series of acts may be performed by a client device within a client device boundary 500 in connection with monitoring resource usage for the client device. One or more acts from the illustrated series of acts may be performed by a task scheduler (e.g., a device health monitor 206 on a task scheduler 204 as shown in FIG. 2).

As shown in FIG. 5A, the client device may perform an act 502 of running a client agent. This may involve running the client agent in accordance with agent policies as discussed in connection with one or more embodiments herein. For example, upon installing and registering a client agent, a plugin scheduler may periodically access policy data on a plugin policy table to determine which plugins of a plurality of plugins should be triggers for a given interval of time. In one or more embodiments, running the client agent simply involves causing the client agent to run on the client device in accordance with normal runtime behavior.

As shown in FIG. 5A, a device health monitor may perform an act 504 of monitoring CPU and memory usage of the client agent. As noted above, this may be performed by a device health monitor that is external to the client agent and configured to externally track the CPU and memory usage of the client device. In one or more embodiments, this resource usage information may be compared against resource usage information tracked internally by an agent health monitor and/or plugin health monitor. In one or more embodiments, the device health monitor samples the CPU and memory usage data at fixed intervals in accordance with one or more device-level policies. This sampling can provide an overview of CPU and memory usage over time.

As shown in FIG. 5A, the device health monitor can perform an act 506 of determining whether the tracked resource usage exceeds a threshold (or otherwise violates a device-level policy in some way). More specifically, the device health monitor may determine whether the CPU and memory usage are greater than a threshold over some period of time. Where the tracked CPU and memory usage do not exceed a threshold, the client device may continue running the client agent under normal operating conditions and the device health monitor may continue monitoring CPU and memory usage of the client agent, as shown in FIG. 5A.

Alternatively, where the CPU and memory usage are determined to be greater than a threshold quantity of CPU and memory usage, the client device may perform 508 one or more power mediation action(s). For example, in one or more embodiments, the client device may provide instructions to the client agent to stop running the client agent for some period of time. In one or more embodiments, the device health monitor may cause the client agent to restart.

Figure 5B:
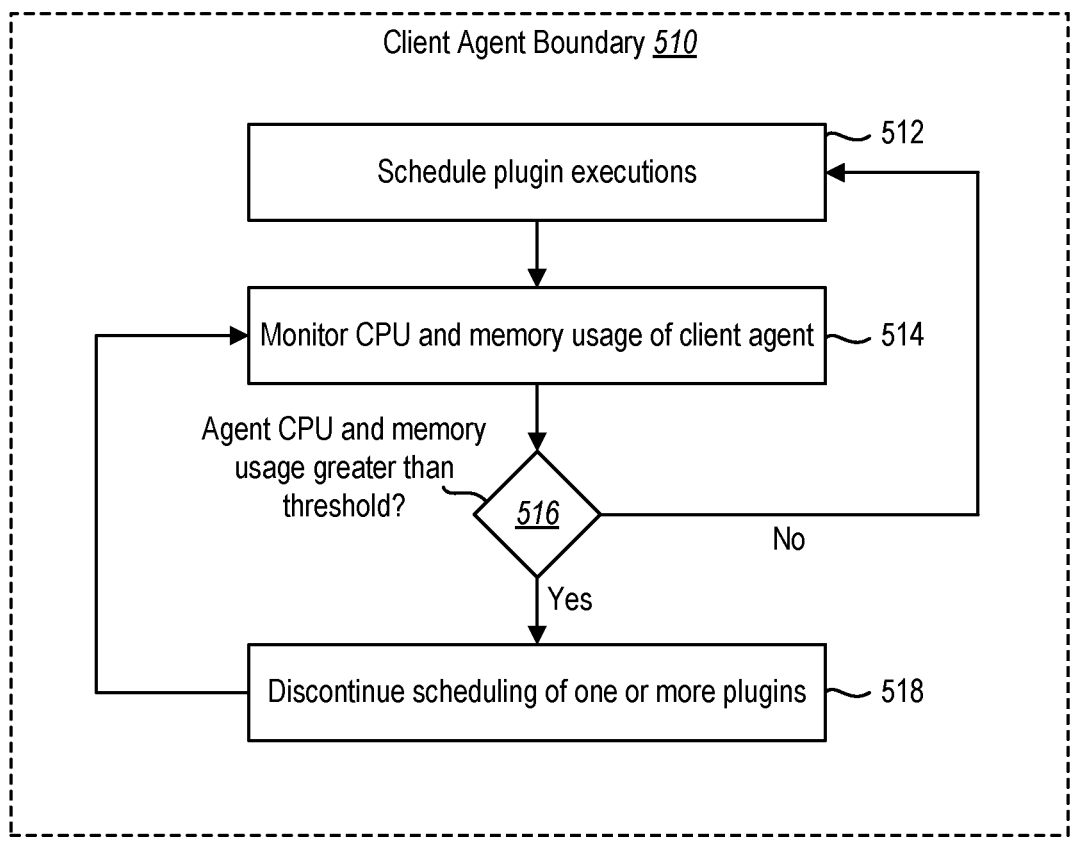
FIG. 5B illustrates an example implementation in which an agent-level health monitor tracks resource usage of the client agent in accordance with one or more embodiments.

FIG. 5B illustrates an example implementation showing a series of acts that may be performed in connection with collecting resource data and self-healing at an agent level. In particular, as shown in FIG. 5B, a series of acts may be performed by a client agent within a client agent boundary 510 in connection with monitoring resource usage for the client agent. One or more acts from the illustrated series of acts may be performed by an agent health monitor (e.g., an agent health monitor 212 on an agent health and update system 210).

As shown in FIG. 5B, the client agent may perform an act 512 of scheduling plugin executions. For example, as discussed in connection with one or more embodiments, a plugin scheduler 216 may periodically trigger one or more plugins from a plurality of plugins on the client agent at fixed intervals in accordance with policy data associated with the respective plugins. For instance, the plugin scheduler may periodically trigger each of the plugins that are indicated as active in accordance with scheduler and runtime data indicated within the policy data associated with the corresponding plugins.

As shown in FIG. 5B, the agent health monitor may perform an act 514 of monitoring CPU and memory usage of the client agent. In one or more embodiments, the agent health monitor samples the CPU and memory usage data at fixed intervals to collect resource usage data over some period of time. The agent health monitor may collect this resource usage data over any period of time at a variety of sampling intervals.

The agent health monitor may additionally perform an act 516 of determining whether the agent CPU and memory usage is greater than a threshold. For example, the agent health monitor may determine whether the tracked CPU and memory usage for a given period of time is greater than an expected quantity of CPU and memory usage for the period of time. This comparison may be based on policy data for the client agent. In one or more embodiments, the agent health monitor may compare the tracked CPU and memory usage to an estimated or otherwise expected CPU and memory usage for the client agent based on the collection of plugins that are active or otherwise implemented within the client agent.

It will be understood that the thresholds compared by the device-level health monitor and the agent-level health monitor may be different from one another. For example, in one or more embodiments, the device-level health monitor considers a higher threshold associated with a more robust or invasive mediation action, such as restarting or shutting down the client agent. Conversely, the agent-level health monitor may consider a slightly lower threshold to enable the client to self-heal or otherwise perform one or more less invasive actions before the device takes action.

In the event that the agent health monitor determines that the agent CPU and memory usage does not exceed the threshold, the client agent may continue scheduling plugin runtimes per normal operation and the agent health monitor may continue monitoring CPU and memory usage of the client agent. In this example, the client agent may continue operating under normal conditions so long as the agent CPU and memory usage remains below the predetermined threshold or otherwise remains in compliance with agent policies from the plugin policy table. In one or more embodiments, the agent health monitor may receive an indication from the device that an external device health monitor has determined that the client agent is operating at or above a threshold. In this event, the agent health monitor may modify a sampling interval or simply compare a locally tracked CPU and/or memory metric against the externally tracked metrics to determine whether the client agent is operating as expected.

Alternatively, where the agent health monitor determines that the agent CPU and memory usage is greater than the threshold, the client agent may perform an act 518 of discontinuing to schedule one or more plugins on the client agent. In one or more embodiments, the client agent allows those plugins that are currently executing to continue executing the threads. In one or more embodiments, the client agent selectively schedules certain plugins while discontinuing other plugins. The selective nature of scheduling the plugins may be based on policy data stored on a plugin policy table.

After scheduling of plugins is discontinued, the agent health monitor may continue monitoring CPU and memory usage of the client agent to determine whether operating conditions of the client agent change as a result of discontinuing the various plugins. In the event that the agent CPU and memory usage fall below the threshold, the client agent may provide a report of the CPU and memory usage and continue scheduling execution of plugins as well as monitoring CPU and memory usage. In the event that the agent CPU and memory usage stay at or above the threshold, the client agent may further discontinue scheduling the one or more plugins and/or perform additional remediation actions.

Figure 5C:
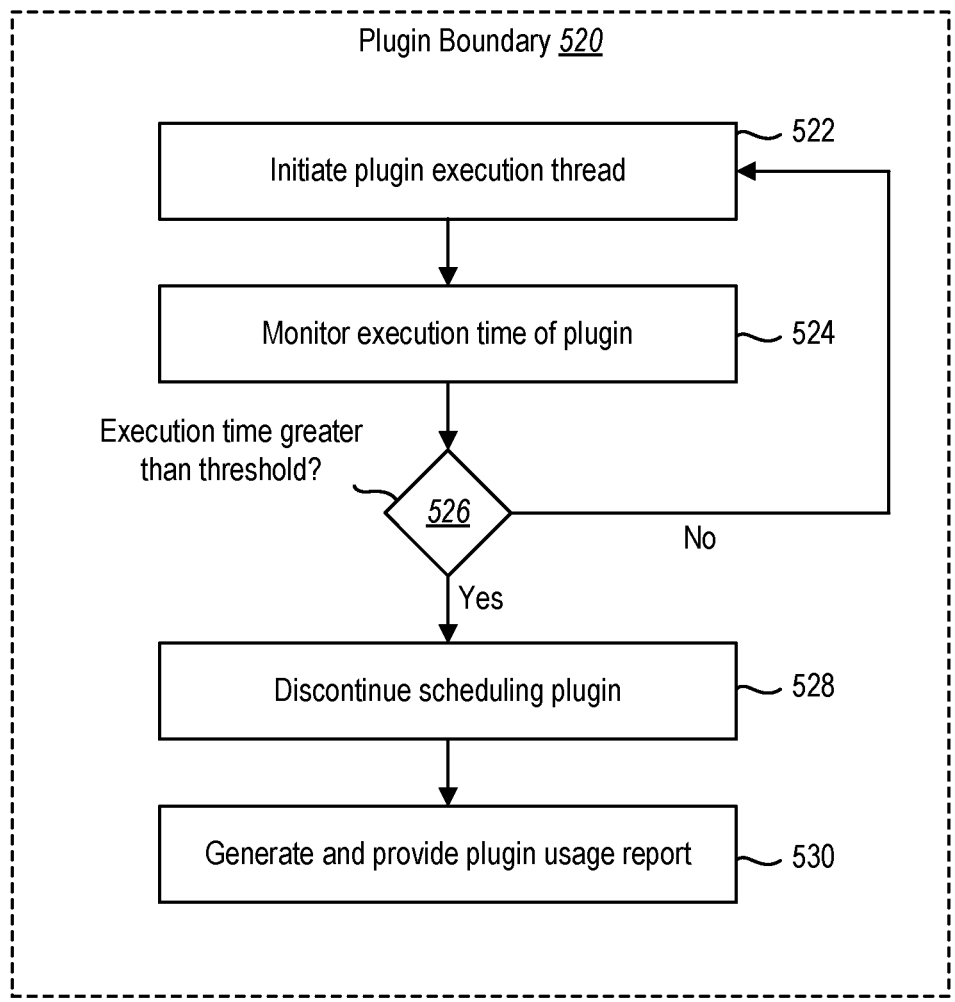
FIG. 5C illustrates an example implementation in which a plugin-level health monitor tracks resource usage of a plugin in accordance with one or more embodiments.

FIG. 5C illustrates an example implementation showing a series of acts that may be performed in connection with collecting resource usage data and self-healing at a plugin level. In particular, as shown in FIG. 5A, a series of acts may be performed by a plugin within a given plugin boundary 520. One or more acts from the illustrated series of acts may be performed by a plugin health monitor.

As shown in FIG. 5C, the plugin may perform an act 522 of initiating a plugin execution thread. In accordance with one or more embodiments described above, the plugin may receive a command from a plugin scheduler to initiate execution of a thread in accordance with a plugin policy for the plugin. Each of the plugins may operate in a similar fashion based on a trigger command received from the plugin scheduler.

As further shown in FIG. 5C, a plugin health monitor may perform an act 524 of monitoring execution time of the plugin. In this example, the plugin health monitor may simply track a duration of time that it takes for the plugin to run a specific task or otherwise execute an execution thread. As noted above, the policy data for the plugin may include an indicated time or estimation of time (e.g., a threshold duration of time) that it should take for the plugin to perform a given task.

As shown in FIG. 5C, the plugin health monitor may perform an act 526 of determining whether the execution time is greater than a threshold. In one or more embodiments, this involves comparing the tracked execution time to an estimated or otherwise expected duration of time that a plugin policy indicates for the corresponding plugin. Where the execution time does not exceed the threshold, a plugin scheduler may continue scheduling plugin execution and the plugin health monitor may continue monitoring execution time for the plugin.

In contrast, where the plugin health monitor determines that the execution time exceeds the threshold, the plugin may perform an act 528 of discontinuing scheduling of the plugin. In one or more embodiments, the plugin may finish executing a current thread. Alternatively, in one or more embodiments, the plugin may stop executing immediately without finishing execution of a thread. In one or more embodiments, the plugin may perform an act 530 of generating and providing a plugin usage report to the client agent or other service to provide a notification that the plugin is taking longer than an expected duration of time to perform an associated task.

By locally monitoring the execution time for a given plugin, the plugin health monitor enables the plugin to implement one or more self-healing actions without interrupting normal functionality of the client device and/or client agent. For example, by discontinuing one or more scheduled executions for the plugin, the plugin may stop running while still allowing other plugins within the client agent to operate as normal. Moreover, because each of the plugins are configured to run respective execution threads in accordance with individual plugin policies, the plugin may stop operating for some period of time to allow the client agent to self-heal without causing other plugins that are operating as expected to stop running and interrupt normal operations.

In addition, while FIGS. 5A-5C are described in isolation from one another with respect to device, agent, and plugin boundaries, it will be appreciated that the actions of the respective series of acts may be used to inform the client agent and/or client device of one or more actions to take in response to various circumstances. For example, where a client agent determines that CPU and memory usage exceed an acceptable threshold, the client agent may consider information received from a plugin health monitor for the plugins indicating one or more plugins that are in violation of plugin policies with respect to duration of time that the plugin(s) are taking to execute associated threads.

In this example, the client agent may selectively disable or discontinue scheduling the specific plugins that are taking longer than an expected period of time to execute and determine whether this causes the CPU and memory usage for the client agent to fall below the threshold. Further, the client agent may consider this information in generating and providing a usage report to an agent management system 118 and/or partner services 108 for use in selectively troubleshooting specific plugins that are misbehaving on the client agent. Reports from multiple agents may be used to determine if certain plugins are operating incorrectly on a large scale or where failures are isolated to specific client agents.

Figure 6:
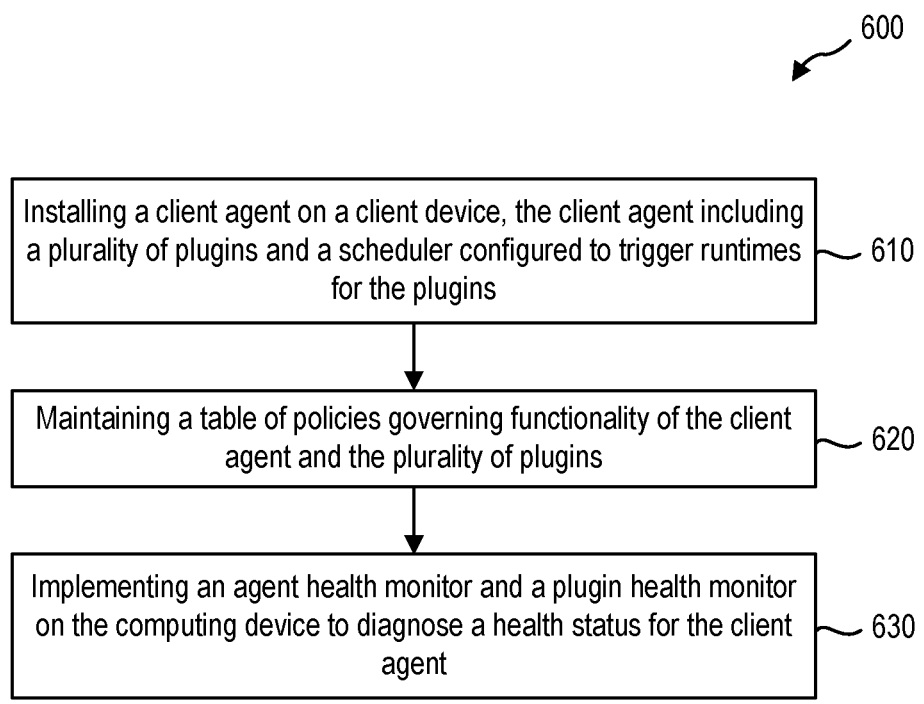
FIG. 6 illustrates an example series of acts for implementing a plurality of health monitors on a client agent in accordance with one or more embodiments.
Figure 7:
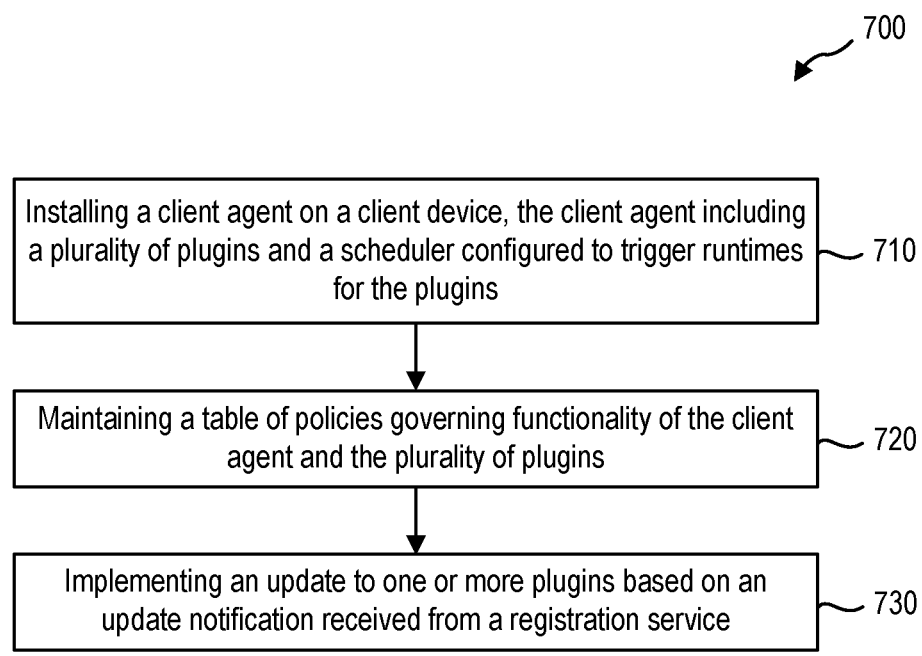
FIG. 7 illustrates an example series of acts for implementing and updating a client agent in accordance with one or more embodiments.

Turning now to FIGS. 6-7, these figures illustrate example flowcharts including series of acts for implementing a client agent having a plugin framework thereon in accordance with one or more embodiments described herein. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device (e.g., a server device) to perform the acts of FIGS. 6-7. In still further embodiments, a system can perform the acts of FIGS. 6-7.

FIG. 6 illustrates a series of acts 600 related to implementing a client agent having a plugin framework and implementing a plurality of health monitors thereon. As shown in FIG. 6, the series of acts 600 includes an act 610 of installing (or simply running) a client agent on a client device, the client agent including a plurality of plugins and a scheduler configured to trigger runtimes for the plugins. For example, in one or more embodiments, the act 610 includes running a client agent on a client device, the client agent being configured to execute a plurality of functions on the client device. In one or more implementations, the client agent includes a plurality of plugins associated with the plurality of functions, each plugin of the plurality of plugins being configured to execute a thread that is isolated from other threads associated with other plugins from the plurality of plugins. The client agent may further include a scheduler configured to trigger runtimes for each plugin of the plurality of plugins.

As further shown in FIG. 6, the series of acts 600 may include an act 620 of maintaining a table of policies governing functionality of the client agent and the plurality of plugins. For example, in one or more embodiments, the act 620 involves maintaining a table of policies governing functionality of the client agent and the plurality of plugins where the table of policies are accessible to the scheduler for triggering runtimes in accordance with the respective policies. In one or more embodiments, the table of plugin policies includes one or more policies for each plugin from the plurality of plugins.

As further shown in FIG. 6, the series of acts 600 may include an act 630 of implementing an agent health monitor and a plugin health monitor on the computing device to diagnose a health status for the client agent. For example, in one or more implementations, the act 630 involves implementing a plurality of health monitors on the computing device to diagnose a health status for the agent. The plurality of health monitors may include an agent monitor configured to track resource usage for the client agent and a plugin monitor configured to track resource usage by the plurality of plugins. In one or more embodiments, the plurality of health monitors further includes a system monitor configured to track resource usage for the computing device. In one or more embodiments, the agent monitor is configured to track resource usage data including CPU usage and memory usage by the client agent. In one or more implementations, the plugin monitor may be configured to track execution durations for the plurality of plugins.

In one or more embodiments, the series of acts 600 includes tracking, by the plugin monitor, resource usage metrics for each plugin from the plurality of plugins. The series of acts 600 may additionally include comparing tracked resource usage metrics for a first plugin with a plugin policy from the table of policies associated with the first plugin to determine that the first plugin is in violation of the plugin policy. The series of acts 600 may also include discontinuing a scheduled runtime for the first plugin based on the first plugin being in violation of the plugin policy. In one or more embodiments, the scheduled runtime for the first plugin is discontinued without discontinuing one or more additional scheduled runtimes for other plugins from the plurality of plugins. In one or more embodiments, the series of acts 600 further includes providing, to a partner service external to the computing device, a usage report indicating that the first plugin is in violation of the plugin policy.

In one or more embodiments, the series of acts 600 include tracking, by the agent monitor, resource usage data for the client agent on the client device. The series of acts 600 may further include comparing resource usage data for the client agent with a client agent policy from the table of policies to determine that the client agent is in violation of the client agent policy. In one or more embodiments, the series of acts includes discontinuing, by the scheduler, one or more scheduled runtimes for the plurality of plugins based on the client agent being in violation of the client agent policy.

In one or more embodiments, the series of acts 600 includes tracking, by the agent monitor, additional usage data for the client agent on the client device while the one or more scheduled runtimes are discontinued. In one or more embodiments, the series of acts 600 includes comparing the additional usage data for the client agent with the client agent policy to determine that the client agent is no longer in violation of the client agent policy. In one or more embodiments, the series of acts 600 further includes resuming, by the scheduler, scheduled runtimes for the plurality of plugins based on the client agent no longer being in violation of the client agent policy.

In one or more embodiments, the one or more policies for each plugin includes a first policy associated with metadata of an associated plugin indicating an active status or an inactive status. In one or more embodiments, the one or more policies for each plugin may include a second policy associated with a runtime schedule and managing runtime behavior of the associated plugin.

FIG. 7 illustrates an example a series of acts 700 related to implementing a client agent having a plugin framework and implementing one or more updates to the agent and/or plugins thereon. As shown in FIG. 7, the series of acts 700 includes an act 710 of installing (or simply running) a client agent on a client device, the client agent including a plurality of plugins and a scheduler configured to trigger runtimes for the plugins. For example, in one or more implementations, the act 710 includes running a client agent on a client device, the client agent being configured to execute a plurality of functions on the client device. In one or more implementations, the client agent includes a plurality of plugins associated with the plurality of functions, each execution of each plugin of the plurality of plugins having an associated thread that is isolated from other threads being executable by the plurality of plugins (e.g., by other plugins from the plurality of plugins). The client agent may further include a scheduler configured to trigger runtimes for each plugin of the plurality of plugins.

As further shown, the series of acts 700 may include an act 720 of maintaining a table of policies governing functionality of the client agent and the plurality of plugins. For example, in one or more embodiments, the act 720 involves maintaining a table of policies governing functionality of the client agent and the plurality of plugins where the table of policies are accessible to the scheduler for triggering runtimes in accordance with the respective policies. In one or more embodiments, the table of plugin policies includes one or more policies for each plugin from the plurality of plugins.

As further shown, the series of acts 700 may include an act 730 of implementing an update to one or more plugins based on an update notification received from a registration service. For example, in one or more implementations, the act 730 involves implementing an update to one or more plugins from the plurality of plugins based on an update notification received from a registration service on a cloud computing system.

In one or more embodiments, implementing the update to the one or more plugins includes receiving an update to one or more policies on the table of policies associated with the one or more plugins and activating the one or more policies in connection with the one or more plugins on the client agent. In one or more embodiments, the update to the one or more policies originates from a third-party partner service associated with the one or more plugins via the registration service on the cloud computing system. In one or more embodiments, the series of acts 700 further includes providing, to the partner service, one or more usage reports associated with resource usage of the one or more plugins.

In one or more embodiments, the update is generated by the third party partner service based on the one or more usage reports.

In one or more embodiments, implementing the update to the one or more plugins includes receiving a notification of an upgraded version of the client agent available for installation on the client device. The upgraded version of the client device may include a first subset of plugins from the plurality of plugins that have been modified from a previous version of the client agent and a second subset of plugins from the plurality of plugins that have not been modified from the previous version of the client agent. In one or more embodiments, implementing the update includes installing the upgraded version of the client agent on the client device.

Figure 8:
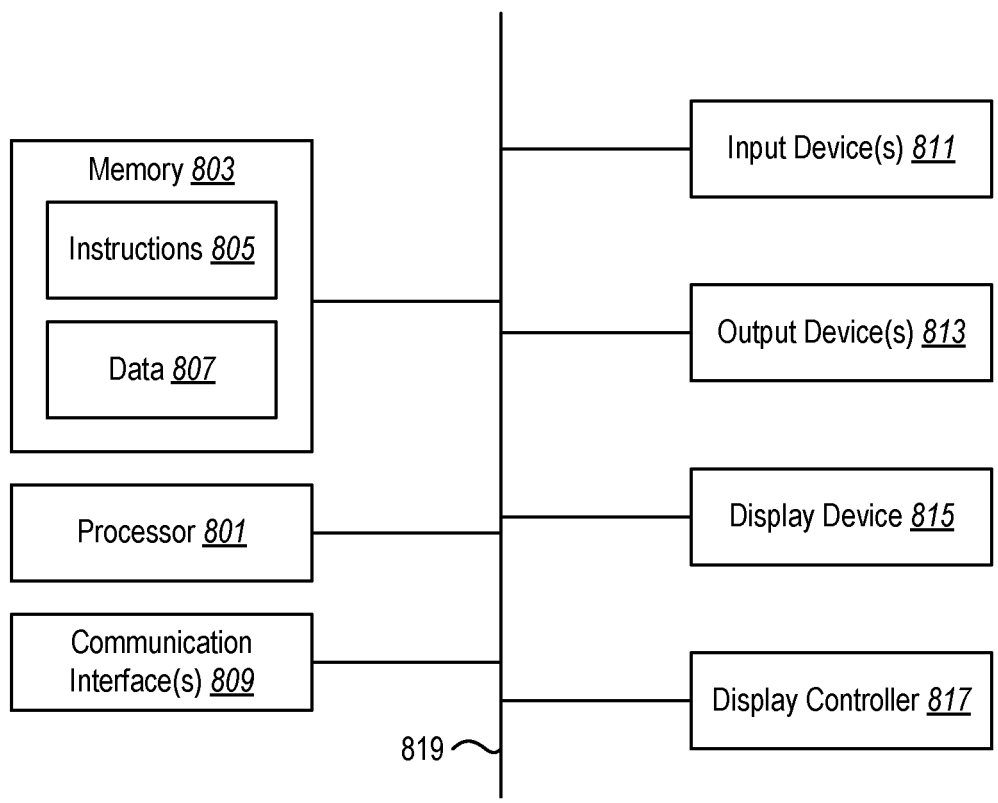
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for implementing an agent on a computing device, the method comprising:
    running a client agent on a client device, the client agent being configured to execute a plurality of functions on the client device, wherein the client agent includes:
        a plurality of plugins associated with the plurality of functions, the plurality of plugins being configured such that each execution of each of the plugins uses a respective thread of execution, and during execution, the threads of execution used by the plugins being executed are isolated from each other; and
        a scheduler configured to trigger runtimes of the plurality of plugins;
    maintaining a table of policies governing functionality of the client agent and the plurality of plugins, the table of policies being accessible to the scheduler to trigger runtimes in accordance with the respective policies from the table of policies, wherein the table of policies includes at least one policy of each plugin from the plurality of plugins;
    implementing an agent health monitor configured to track a metric of resource consumption of the client agent and a plugin health monitor configured to track a metric of resource consumption by the plurality of plugins;
    determining, using the agent health monitor and based on tracking a metric of resource consumption of the client agent, that the client agent is in violation of an agent policy from the table of policies;
    determining, using the plugin health monitor, that a first plugin of the plurality of plugins is in violation of a first plugin policy from the table of policies;
    discontinuing, based on the first plugin being in violation of the first plugin policy, a scheduled runtime of the first plugin, the scheduled runtime of the first plugin being discontinued without discontinuing at least one additional scheduled runtime of other plugins from the plurality of plugins;
    determining, based on continuing to track the metric of resource consumption of the client agent after discontinuing the scheduled runtime of the first plugin, that the client agent is no longer in violation of the agent policy from the table of policies; and
    resuming, by the scheduler, the scheduled runtime for the first plugin.

2. The method of claim 1, further comprising implementing a system health monitor configured to track resource consumption of the computing device.

3. The method of claim 1, wherein the agent health monitor is configured to track resource consumption data including central processing unit (CPU) usage and memory usage by the client agent, and wherein the plugin health monitor is configured to track execution durations of the plurality of plugins.

4. The method of claim 1, further comprising:
    tracking, by the plugin health monitor, resource consumption metrics of each plugin from the plurality of plugins.

5. The method of claim 1, further comprising providing, to a partner service external to the computing device, a usage report indicating that the first plugin is in violation of the plugin policy.

6. The method of claim 1, further comprising:
    tracking, by the agent health monitor, resource consumption data of the client agent on the client device;
    comparing resource consumption data of the client agent with a client agent policy from the table of policies to determine that the client agent is in violation of the client agent policy; and
    discontinuing, by the scheduler and based on the client agent being in violation of the client agent policy, at least one scheduled runtime of the plurality of plugins.

7. The method of claim 1, wherein the at least one policy of each plugin includes:
    a first policy associated with metadata of an associated plugin indicating an active status or an inactive status; and
    a second policy associated with a runtime schedule and managing runtime behavior of the associated plugin.

8. A method for implementing an agent on a computing device, the method comprising:
    running a client agent on a client device, the client agent being configured to execute a plurality of functions on the client device, wherein the client agent includes:
        a plurality of plugins associated with the plurality of functions, the plurality of plugins being configured such that each execution of each of the plugins uses a respective thread of execution, and during execution, the threads of execution used by the plugins being executed are isolated from each other; and
        a scheduler configured to trigger runtimes of the plurality of plugins;
    maintaining a table of policies governing functionality of the client agent and the plurality of plugins, the table of policies being accessible to the scheduler to trigger runtimes in accordance with the respective policies from the table of policies, wherein the table of policies includes at least one policy of each plugin from the plurality of plugins;
    implementing, based on an update notification received from a registration service on a cloud computing system, an update to at first plugin from the plurality of plugins;
    determining that that first plug-in is in violation of a first plugin policy from the table of policies;
    discontinuing based on the first plug-in being in violation of the first plugin policy, the scheduled runtime of the first plugin without discontinuing at least one additional scheduled runtime of other plugins from the plurality of plugins;
    implementing the update based on the update notification received from the registration service on the cloud computing system; and
    resuming, by the scheduler, the scheduled runtime for the first plugin.

9. The method of claim 8, wherein implementing the update to the at least one plugin comprises:
    receiving an update to at least one policy on the table of policies associated with the first plugin; and
    activating the at least one policy in connection with the first plugin on the client agent.

10. The method of claim 8, wherein the update to the at least one policy originates from a third-party partner service associated with the first plugin via the registration service on the cloud computing system.

11. The method of claim 10, further comprising providing, to the third-party partner service, at least one report associated with resource consumption of the first plugin, and wherein the update to the at least one policy is generated by the third-party partner service based on the at least one report.

12. The method of claim 8, wherein implementing the update to the first plugin comprises:
receiving a notification of an upgraded version of the client agent available for installation on the client device, wherein the upgraded version of the client agent includes a first subset of plugins from the plurality of plugins that have been modified from a previous version of the client agent and a second subset of plugins from the plurality of plugins that have not been modified from the previous version of the client agent; and
installing the upgraded version of the client agent on the client device.

13. The method of claim 8, further comprising implementing a system health monitor configured to track resource consumption of the computing device.

14. The method of claim 8, wherein the at least one policy of each plugin includes:
a first policy associated with metadata of an associated plugin indicating an active status or an inactive status; and
a second policy associated with a runtime schedule and managing runtime behavior of the associated plugin.

15. A system, comprising:
at least one processor;
memory in electronic communication with the at least one processor; and
instructions stored in the memory, the instructions being executable by the at least one processor to:
run a client agent on a client device, the client agent being configured to execute a plurality of functions on the client device, wherein the client agent includes:
a plurality of plugins associated with the plurality of functions, the plurality of plugins being configured such that each execution of each of the plugins uses a respective thread of execution, and during execution, the threads of execution used by the plugins being executed are isolated from each other; and
a scheduler configured to trigger runtimes of the plurality of plugins;
maintain a table of policies governing functionality of the client agent and the plurality of plugins, the table of policies being accessible to the scheduler to trigger runtimes in accordance with the respective policies from the table of policies, wherein the table of policies includes at least one policy of each plugin from the plurality of plugins;
implement an agent health monitor configured to track a metric of resource consumption of the client agent and a plugin health monitor configured to track a metric of resource consumption by the plurality of plugins;
determine, using the agent health monitor and based on tracking a metric of resource consumption of the client agent, that the client agent is in violation of an agent policy from the table of policies;
determine, using the plugin health monitor, that a first plugin of the plurality of plugins is in violation of a first plugin policy from the table of policies;
discontinue, based on the first plugin being in violation of the first plugin policy, a scheduled runtime of the first plugin, a scheduled runtime of the first plugin being discontinued without discontinuing at least one additional scheduled runtime of other plugins from the plurality of plugins;
determine, based on continuing to track the metric of resource consumption of the client agent after discontinuing the scheduled runtime of the first plugin, that the client agent is no longer in violation of the agent policy from the table of policies; and
resume, by the scheduler, the scheduled runtime for the first plugin.

16. The system of claim 15, wherein the agent health monitor is configured to track resource consumption data including central processing unit (CPU) usage and memory usage by the client agent, and wherein the plugin health monitor is configured to track execution durations of the plurality of plugins.

17. The system of claim 15, further comprising instructions being executable by the at least one processor to:
track, by the plugin health monitor, resource consumption metrics of each plugin from the plurality of plugins.

18. The system of claim 15, further comprising instructions being executable by the at least one processor to:
track, by the agent health monitor, resource consumption data of the client agent on the client device;
compare resource consumption data of the client agent with a client agent policy from the table of policies to determine that the client agent is in violation of the client agent policy; and
discontinue, by the scheduler and based on the client agent being in violation of the client agent policy, at least one scheduled runtime of the plurality of plugins.

19. The system of claim 15, wherein the at least one policy of each plugin includes:
a first policy associated with metadata of an associated plugin indicating an active status or an inactive status; and
a second policy associated with a runtime schedule and managing runtime behavior of the associated plugin.

* * * * *